(12) United States Patent
Rashkovskiy et al.

(10) Patent No.: US 8,578,405 B2
(45) Date of Patent: Nov. 5, 2013

(54) PROVIDING CONTENT INTERRUPTIONS

(75) Inventors: Oleg B. Rashkovskiy, Cupertino, CA (US); Thomas J. Morgan, San Mateo, CA (US); Matthew Wong, Palo Alto, CA (US); Brian T. Duersch, Mountain View, CA (US)

(73) Assignee: Blackarrow, Inc., San Jose, CA (US)

( * ) Notice: Subject to any disclaimer, the term of this patent is extended or adjusted under 35 U.S.C. 154(b) by 1061 days.

(21) Appl. No.: 12/542,036

(22) Filed: Aug. 17, 2009

(65) Prior Publication Data

US 2009/0304357 A1 Dec. 10, 2009

Related U.S. Application Data

(60) Division of application No. 11/715,171, filed on Mar. 7, 2007, now abandoned, which is a continuation-in-part of application No. 09/561,443, filed on Apr. 28, 2000, now abandoned, and a continuation-in-part of application No. 09/690,159, filed on Oct. 17, 2000, now abandoned, and a continuation-in-part of application No. 09/690,549, filed on Oct. 17, 2000, now abandoned.

(51) Int. Cl.
 *H04N 7/025* (2006.01)
 *H04N 5/445* (2011.01)
 *H04N 7/16* (2011.01)

(52) U.S. Cl.
 USPC ................................ 725/32; 725/42; 725/142

(58) Field of Classification Search
 None
 See application file for complete search history.

(56) References Cited

U.S. PATENT DOCUMENTS

| | | | |
|---|---|---|---|
| 7,877,290 B1* | 1/2011 | Arsenault et al. | 705/14.4 |
| 8,078,493 B2* | 12/2011 | Rosenberg et al. | 705/14.4 |
| 8,155,498 B2* | 4/2012 | Dow et al. | 386/221 |
| 2002/0095674 A1* | 7/2002 | Lowthert et al. | 725/32 |
| 2004/0034874 A1* | 2/2004 | Hord et al. | 725/136 |
| 2007/0300263 A1* | 12/2007 | Barton et al. | 725/60 |
| 2008/0115161 A1* | 5/2008 | Kurzion | 725/32 |

\* cited by examiner

*Primary Examiner* — Chris Parry
(74) *Attorney, Agent, or Firm* — FSP LLC

(57) ABSTRACT

A system includes a receiver to receive content and an advertisement. The system further includes a cache, coupled to the receiver, to store the content and the advertisement. An interface in the receiver receives an updated advertisement and updating instructions, the updating instructions to enable the receiver to replace the stored advertisement with the updated advertisement. The receiver detects a starting point of the advertisement and creates a marker and inserts it into the content to indicate said starting point, and stores the advertisement from the content to a memory storage location separate from the content, and creates and stores a pointer to the memory location. The interface detects a user-initiated pause in the viewing of content, retrieves the updated advertisement from storage, and provides a user interface that enables the user to view the retrieved advertisement for as long as the viewing of the content remains paused. The receiver is configured to overlay the retrieved advertisement with material descriptive of upcoming content in the received content.

11 Claims, 11 Drawing Sheets

PROVIDING CONTENT INTERRUPTIONS

CROSS-REFERENCE TO RELATED APPLICATIONS

This application is a divisional of U.S. patent application Ser. No. 11/715,171, filed on Mar. 7, 2007 now abandoned, which is a continuation-in-part of prior application Ser. No. 09/561,443, filed on Apr. 28, 2000 now abandoned, application Ser. No. 09/690,159, filed on Oct. 17, 2000, now abandoned, and application Ser. No. 09/690,549, also filed on Oct. 17, 2000 now abandoned.

BACKGROUND

This invention relates generally to broadband content distribution and systems that record the distributed content for subsequent display.

Broadband content distribution may involve the distribution of television programming to a large number of receivers as well as the distribution of other forms of content. Content which may be amenable to wide spread distribution includes video, graphics, software, audio and games.

The ability to charge customers for content in many cases means that the type of content that may be distributed may be of higher quality. Thus, pay-per-view television programming is widely accepted.

However, there is a considerable demand for the distribution of content without charge. Conventional television broadcasts subsidize distribution through an advertising scenario. Similarly, in connection with the Internet, a large amount of content is distributed for free with the hope that viewers will patronize advertisers that pay for banner ads that accompany the content.

Thus, it would be desirable to include advertising material or other interruptions in the course of a wide variety of content that might be distributed for free or at reduced charge in a broadband distribution network. However, many content formats are not amenable to the ready incorporation of advertising material. For example, games and software could be distributed with banner ads. However, full screen display of advertisements is generally not viable because there is no way to know when to insert these advertisements in the course of the video game or software operation.

An interruptible content delivery system allows the play of any of a variety of types of selectable content to be paused to permit the automatic insertion of advertising material. Thus, the play of audio, video, games, graphics, software or other media may be paused automatically to allow insertion of advertisements. At the end of the advertisement, the content restarts where it left off.

Generally, advertisers prefer to target their advertisements to specific demographic profiles. For example, advertisers may attempt to target a specific demographic profile based on the nature of a particular type of content such as the nature of the television program. The advertisers may determine that people who enjoy particular types of content, such as particular television programs, may be more likely to purchase particular types of products.

Advertisers, who prefer to maintain an image, may prefer to avoid having their advertisements run in conjunction with content that may have controversial aspects. Controversial aspects may include violence, language, adult situations, sexual content and the like. Thus, advertisers may prefer to target their advertisements to that content more likely to be enjoyed by the advertiser's target audience.

Of course in some potential interruptible content delivery systems, it may not be known in advance what content may be played at any given time. Instead, in many situations, the user may be in control of selecting the content that is played at any particular time. Thus, the issue arises how to insert advertisements in a fashion that may be acceptable to advertisers. In particular, it may be necessary to ensure that specific ads are associated with particular types of content either because of the type of content involved or because the advertiser may believe that particular types of audiences are more likely to be attracted to specific types of content.

Distributed content may be recorded on a digital recording device for subsequent replay from random access memories. Such recording devices can pause ongoing play of content while continuing to record incoming content. Digital recording devices, using random access memories, are more versatile than videocassette recorders that use tape or serial memories. Thus, digital recording devices are becoming increasingly popular with consumers.

Generally, when the distributed content is a television program that includes advertisements, the advertisements are recorded together with the program content. When the recorded content is replayed, the advertisements may be outdated. Thus, the replay of outdated advertisements may seem odd. Moreover, from the advertiser's point of view, the value of repeated play of the content, including the advertisements, may be reduced.

Thus, there is also a need for improved techniques for storing advertisements in digital recording devices and for ways to generally enable advertising to be inserted in an interruptible content delivery system and more specifically to enable inserting advertising so as to implement advertiser guidelines.

DETAILED DESCRIPTION

Figure 1:
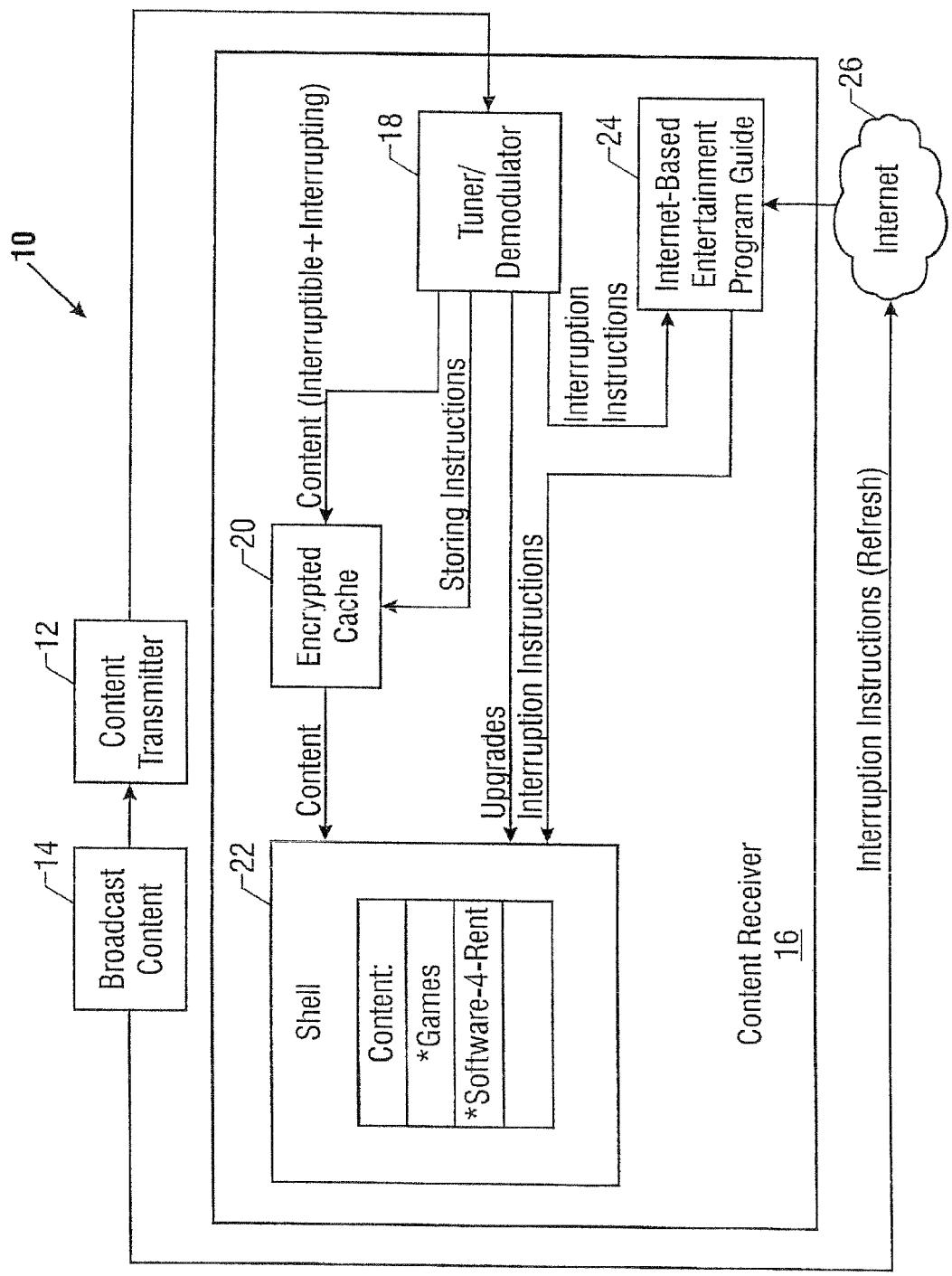
FIG. 1 is a schematic depiction of a broadband digital distribution system in accordance with one embodiment of the present invention.

A digital broadband distribution network 10, shown in FIG. 1, may implement the distribution of a variety of content formats and the provision of content interruptions on a content receiver 16. The content receiver 16 receives content from a content transmitter 12 that in turn receives broadcast content from a content provider 14.

The content transmitted by the transmitter 12 may be made up of conventional content termed "interruptible content" and "interrupting content". Interruptible content is content whose operation, play, or use may be interrupted for the substitution of other content. The content that is temporarily substituted for the interruptible content is called the interrupting content.

In accordance with one embodiment, interruptible content that the user desires to receive may be interrupted with interrupting content that may help to pay for the interruptible content. The interrupting content may include advertisements.

The interruptible content may be video, graphics, audio, games, and other software such as application software. The interrupting content may be substituted for the interruptible content under control of the receiver 16 in one embodiment.

The content from the content transmitter 12 is received by a tuner/demodulator 18 contained in the digital content receiver 16. The tuner/demodulator 18 tunes to one or more channels and demodulates those channels for display. In addition, the tuner/demodulator 18 may parse the interruptible and interrupting content and forward that information to an encrypted cache 20. The tuner/demodulator 18 also parses storing instructions utilized for controlling the storage of the content. The storing instructions are also forwarded to the encrypted cache 20 for use in storing the content. In addition, the tuner/demodulator 18 may parse upgrades, provided with the content, for upgrading previously received content. Finally the tuner/demodulator 18 may parse interruption instructions from the rest of the content. These interruption instructions tell when to interrupt the interruptible content with the interrupting content. The interruption instructions may be forwarded to a program guide 24.

The program guide 24 may receive interruption instructions from a back channel that may be coupled to the broadcast content provider 14. The interruption instructions may be conveyed, for example, over the Internet as indicated at 26. In some cases, the interruption instructions may be updated, revised or extended and therefore it may be necessary to convey them after the original content is received.

The program guide 24 may provide a schedule of available information that may be received from the content provider 14. This information may be accessed over the backchannel such as the Internet 26 to reduce the storage requirements on the content receiver 16. The interruption instructions, received over the back channel or as parsed by the tuner/demodulator 18, may be forwarded by the content guide 24 to a shell 22. The shell 22 in one embodiment of the present invention may be a software module that controls the use of content received from the broadcast content provider 14. Moreover, the shell 22 implements the interruption of interruptible content with interrupting content in accordance with interruption instructions received as described previously.

The encrypted cache 20 stores the content in a format that prevents decryption and theft by unauthorized individuals. The encrypted cache 20 may, for example, be part of a hard disk drive. When content is received by the system 10, the shell 22 stores the information on the hard disk drive and particularly in the encrypted cache. For example, the shell 22 may cause the content to be distributed to a variety of storage locations on the hard disk drive so that the content may not be continuously accessed in one contiguous hard drive area. Only the shell 22 can access the map that indicates where the content is stored on the hard disk drive and how it can be reconstructed to play back the content in a meaningful fashion.

Thus, as content is acquired from a source and stored through the shell into the hard disk drive, it is stored in a form that can only be accessed by the shell thereafter. To access the content one must access the content through the shell because only the shell knows where all the portions of the content are stored and how to reconstruct it in a meaningful fashion. Thus, the shell can control access in a variety of ways. For example, the shell can prevent access, the shell can provide access only in return for either watching a commercial or paying a fee or the shell may limit the number of times that the content may be viewed or even the times when the content may be viewed.

Thus, in the embodiment illustrated in FIG. 1, the shell 22 may have content, such as games or rentable software as a few examples. When the user wishes to use the content that is available from the content provider 14, the user may request a download of that information or that information may be conveyed during conditions of high bandwidth availability. Alternatively, other schemes for providing the content to the receiver 16 may be utilized. In general, the transport mechanism may include any digital mechanism such as satellite transmission, cable transmission or airwave broadcast.

Conceivably, the content may also be provided in conventional physical, portable forms such as compact disks (CD-ROM), digital video disks (DVD), flash memory or the like. The content, however received, is encoded in a way in which, absent the use of the shell 22, one would be unable to use, hear, view, play or otherwise enjoy the content. Thus, the system controls access to the content in a secure way using encryption provided with the content as conveyed over the transport media or as received in physical form by the user.

Once the information has been cached in the cache 20, the user can receive the right to enjoy play, hear or view the content as the case may be from the shell 22. The shell 22 then releases the information for use in the appropriate format on the processor-based content receiver 16. The shell 22 may also control the number of times or the time period when the content may be used.

Moreover, the shell 22 monitors a criteria which determines when the content's use is to be interrupted with interrupting content. Thus, the shell 22 may force a mechanism wherein interrupting content may be temporarily played in place of interruptible content. For example, advertisements may be provided together with the interruptible content. Alternatively, the interrupting and interruptible content may be received at different times via different mechanisms.

For example, the interrupting content may be inserted at regular intervals. After allowing content to be played for a predetermined amount of time, interrupting content may be inserted automatically. In other cases, the interrupting content may be inserted when advantageous conditions arise. For example, in connection with gaming software, when the user reaches a stopping point, the system may determine that the action has paused sufficiently that the interrupting content may be inserted.

Figure 5A:
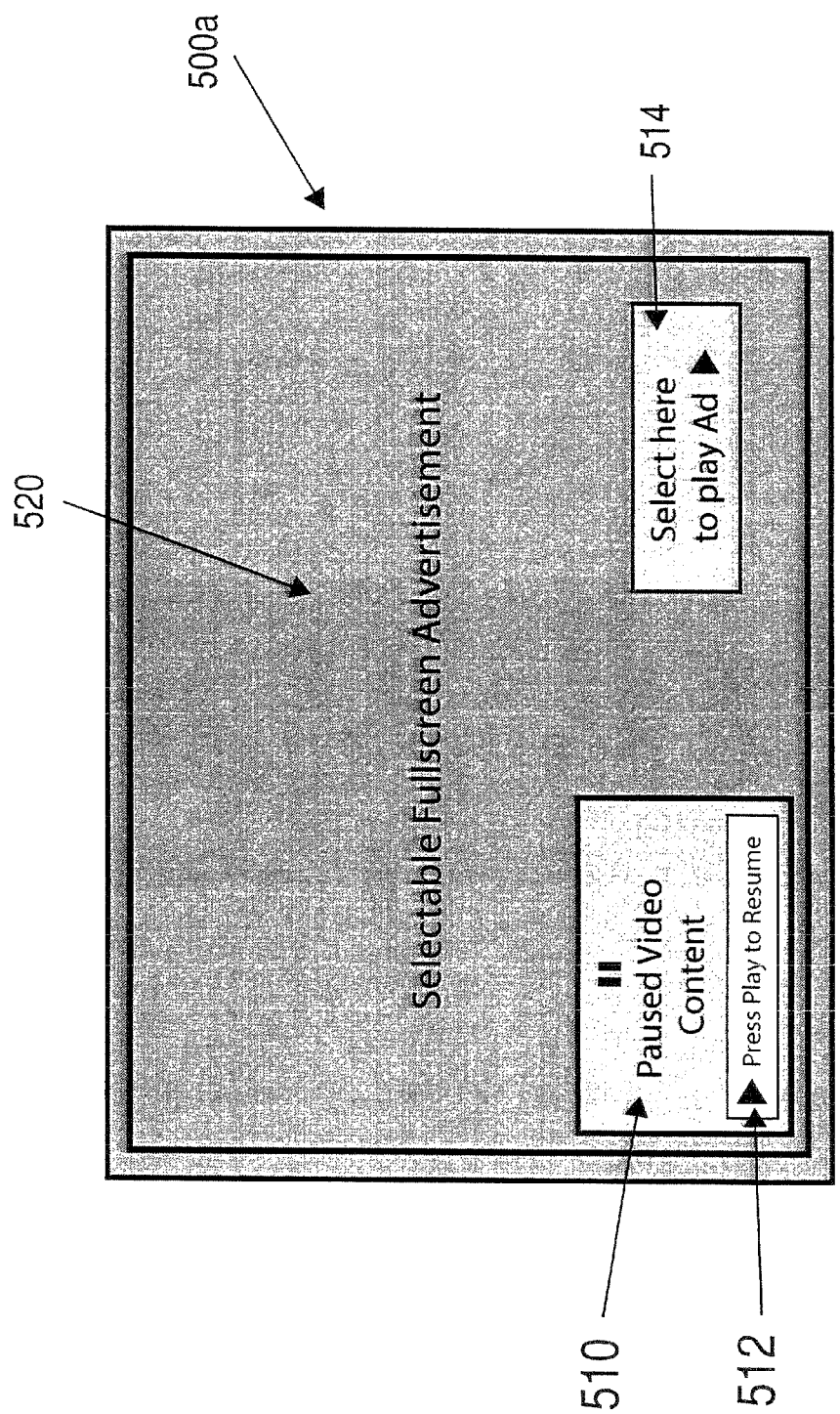
FIGS. 5a and 5b illustrate an embodiment of a user interface for advertisement selection.
Figure 5B:
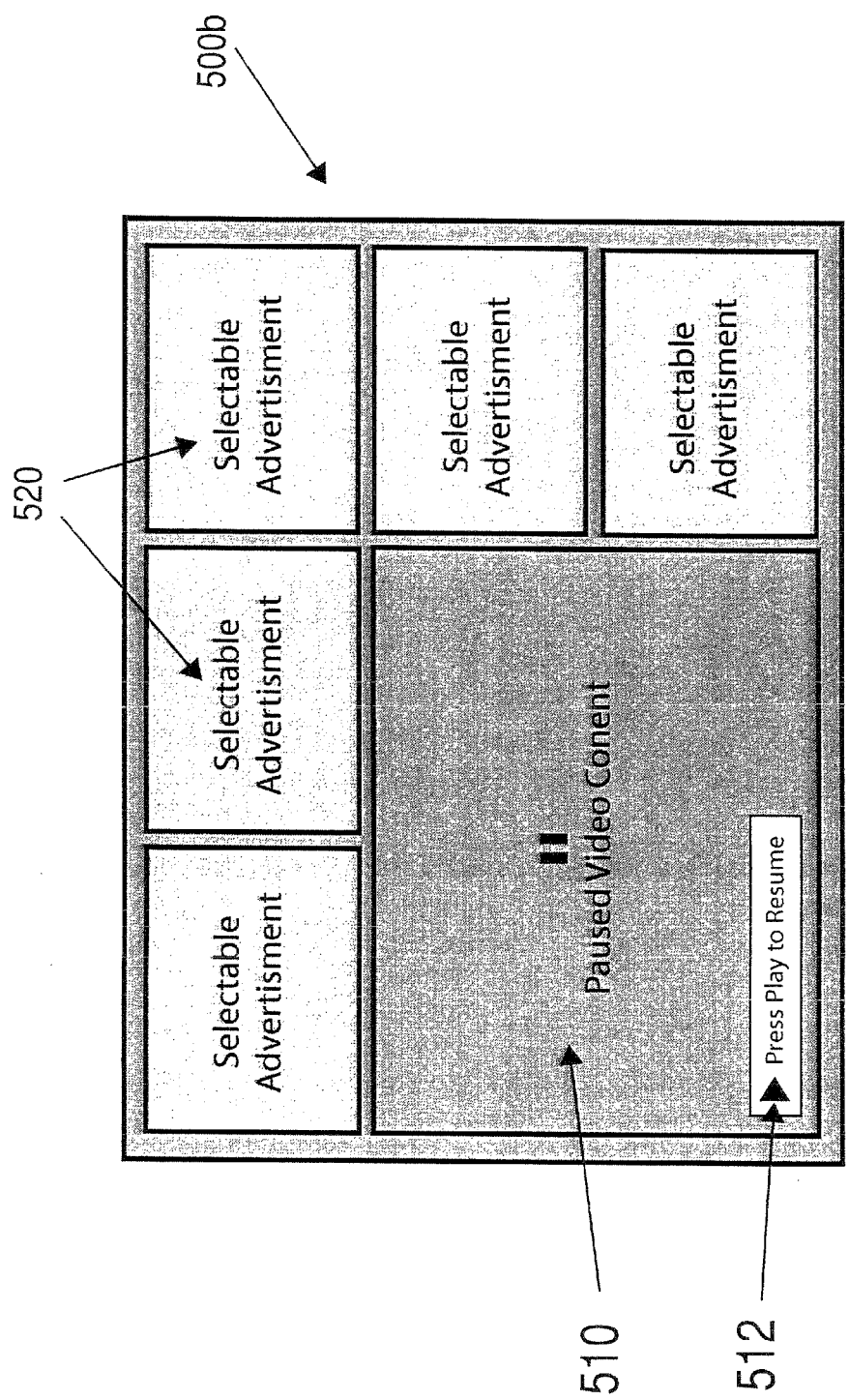

Similarly, if a user temporarily pauses the regular operation, play, or use of the content such as by depressing a pause button on a remote control unit or the like, the system may replace the screen with the paused content with a user interface 500. One exemplary user interface 500*a* is shown in FIG. 5*a* and another is shown in FIG. 5*b*. The user interfaces 500*a* and 500*b* may include one or more selectable advertising programs 520 and the paused video content 510.

As is shown in FIG. 5*a*, a selectable advertisement 520 may occupy almost all of the screen, which may be referred to as a full-screen mode. In this example, a smaller user interface 510 that includes the paused video content and a selectable button 512 may overlay the advertisement 520. It should be noted, however, that embodiments of the full-screen mode are not limited to the depicted relative sizes. For instance, the advertisement 520 can be smaller, overlaying a larger interface 510 of paused video content.

The interface 500a may also include a graphical depiction of a selectable button 514. In response to the selection of the button 514 the advertisement is played. Alternatively, if the advertisement is shown in full-screen mode the advertisement may play automatically, in response to the pause, without user action. It should also be noted that in this and other embodiments, before being selected, the selectable indicia 520 may be a picture, or an animation or video with or without sound.

When the user desires to continue viewing the paused content he or she may resume watching by actuating the button 512. If, however, the paused condition is still in effect and the advertisement is through playing, other advertisements may be presented in the user interface 500 until the user resumes regular use of the content, for example by selecting the icon 512 using an input device or by actuating a play or select button on a remote control unit or the like.

Another embodiment of user interface 500 is shown in FIG. 5b. In this embodiment, more than one selectable advertisement 520 may be presented and they may occupy less than the full screen. For example, the selectable advertisements 520 may be presented in a grid. In this way, more than one advertisement 520 may be simultaneously presented for selection. Additionally, in this exemplary user interface 500b the paused content 510 may occupy a larger portion of the available screen space as compared to the portion depicted in the interface 500a, although embodiments are not limited to the relative sizes shown in the figure. Thus, in an embodiment, the user may select an advertisement from the grid for viewing while the content is paused. In some instances the selected advertisement may be displayed in the grid space. Alternatively, the interface 500b may be replaced by another interface such as an interface similar to 500a. In this way, the advertisement may be displayed in full screen. In this case, however, the interface 500 may not include the button 514 because the user has already selected the advertisement for viewing.

To enable actuation of a selectable option on the interfaces 500a and 500b, the user may use a remote control unit 72. The remote control 72 may include one or more buttons to enable navigation to and selection of the selectable options on the interface 500. Additionally, instead of actuating a graphical button on the interfaces 500a and 500b, for example, using an input device, the user may depress one or more buttons on the remote control 72 such as a play or a select button to return to viewing the paused programming.

Figure 6:
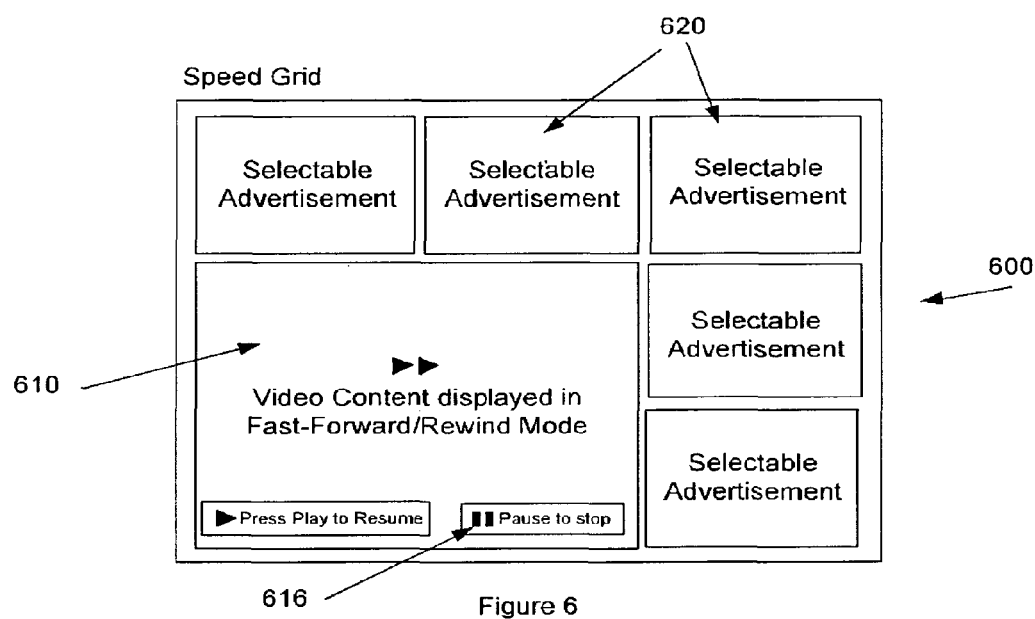
FIG. 6 illustrates another embodiment of a user interface for advertisement selection.

In another embodiment, if the user pauses the content in the form of fast-forwarding or rewinding the content, the user may be presented with an interface 600, which is shown in FIG. 6. As with the user interface 500, the user interface 600 may include one or more selectable advertising programs 620 and an area 610 for viewing and controlling the fast forwarding or rewinding content. In this example, the selectable advertisements 620 are displayed in a grid with a screen for each advertisement adjacent to the content area 610, although embodiments are not limited thereto. In response to selection, the advertisement may be displayed in its area on the grid or it may be displayed full screen with the content in reduced size overlaying the advertisement.

The content area 610 may also include a resume button 612 and a pause button 616. In this way, the user may resume play of the content or pause the content to stop fast forwarding or rewinding. Alternatively, the user may use the remote control unit 72 to stop the content from fast forwarding or rewinding and/or resume play of the content. The remote control 72 may also be used to navigate and select an advertisement 620. It should be noted that in addition to when a user initiates a pause, the interfaces 500 and 600 may be displayed before content is accessed and/or after a content item has ended.

In other embodiments, instead of linearly inserting the interrupting content, the content may be inserted in a progressive fashion. Thus, the more the user uses the content the higher the rate at which interrupting content may be substituted.

In one embodiment of the present invention, the content that is being played may be interrupted with the play of the commercial in real time. That is, when the commercial is broadcast over a broadcast media, it may automatically be inserted into the playback of the content on the system 10 as well.

In one embodiment of the present invention, the interruptible content may be an advertisement; however, the interrupting content may also be a request that the user make some form of payment in order to continue to use the interruptible content. For example, the receiver 16 may be called upon to access backchannel to make a payment for the continued use of the content. When the receiver 16 does so, the receiver 16 may be provided with a code either through the back channel or from the content provider which allows continued use of the interruptible content.

In some embodiments of the present invention, techniques may be utilized to reduce the likelihood that users of the system 10 will discontinue their use when the commercial is played. For example, an overlay may be provided over the commercial to indicate what is coming up next in the content. For example, where the content is game and the commercial is inserted after the user reaches a given level, information may be provided about the next level as an overlay, for example, over the ongoing play of the commercial. Additionally, this same overlay can be used to alert the user that other content is available for viewing. The user may access the additional content by pressing a button on a remote, or by using a mouse or other input device to make a selection.

Figure 2:
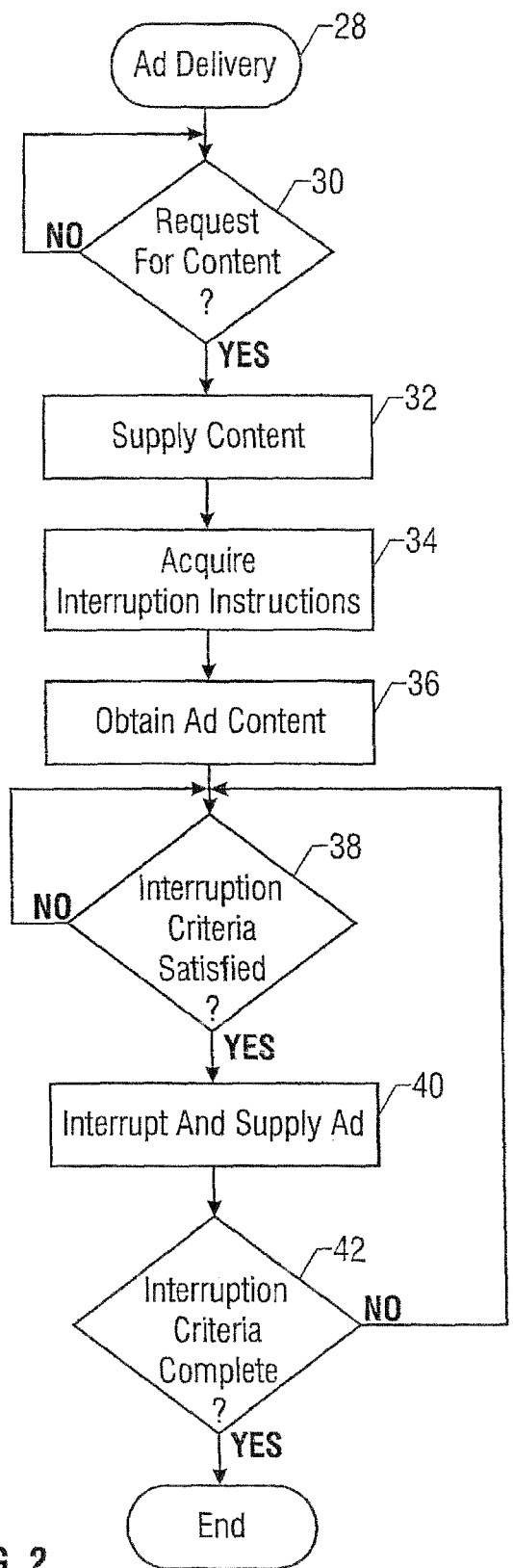
FIG. 2 is a flow chart for software that may be utilized on a receiver in the system shown in FIG. 1.

Referring to FIG. 2, the software 28 for controlling the interruption of the interruptible content may be stored on a suitable storage medium such as a hard disk drive on the receiver 16. Initially, the software 28 waits for a request for content as indicated in diamond 30. Once such a request is received, the content may be supplied as indicated in block 32. In the same process, interruption instructions may be acquired as indicated in block 34 for the content that was requested and supplied in block 32. In addition, interrupting content may then be obtained as indicated in block 36. When an interruption criteria is satisfied, as determined in diamond 38, the ongoing use of the interruptible content may be interrupted as indicated in block 40. Thus, in one embodiment of the present invention, the interruptible content is interrupted upon satisfaction of an interruption criteria. The interrupting content, such as an advertisement, is substituted temporarily.

A check at diamond 42 then determines whether the interrupted criteria is complete. If not, the flow recycles to continue to check to determine whether the interruption criteria is satisfied at diamond 38. Otherwise, the flow ends.

Figure 3:
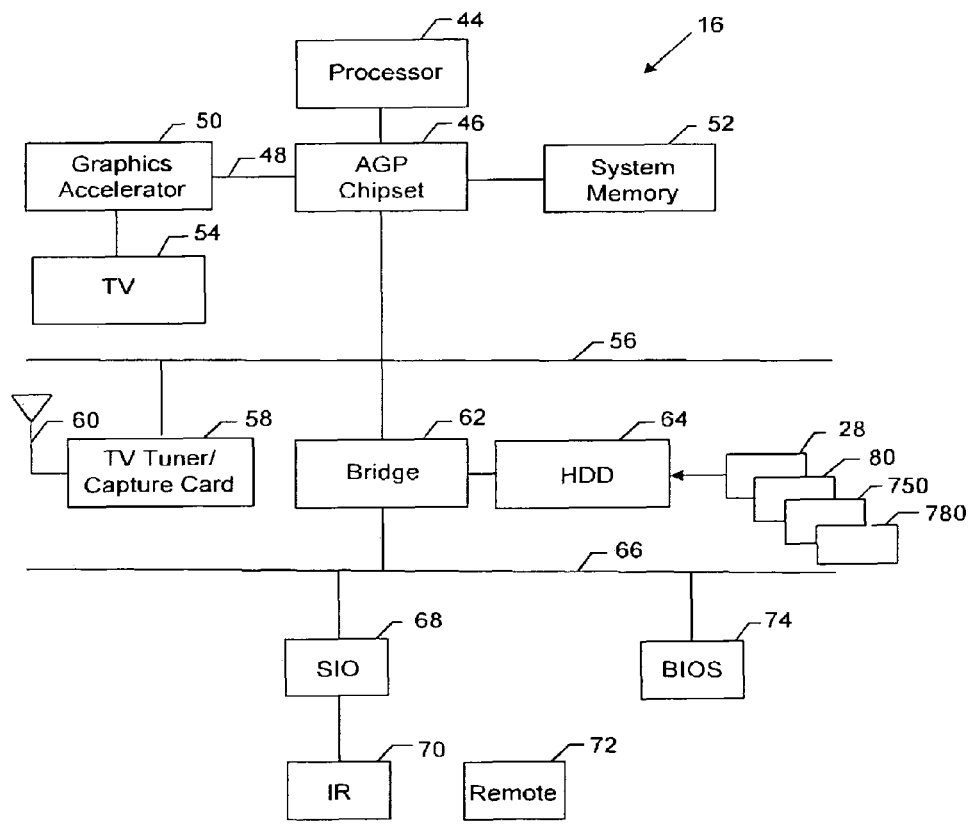
FIG. 3 is a block depiction of a receiver in accordance with one embodiment of the present invention.

A processor-based content receiver 16 in accordance with one embodiment of the present invention shown in FIG. 3, may be a set top box, a desk top computer, an appliance, a handheld device, or other form factors. The receiver 16 may include a processor 44. In one embodiment, the processor 44 may be coupled to an accelerated graphics port (AGP) chipset 46 for implementing an accelerated graphics port embodiment. The chipset 46 communicates with the system memory 52, the AGP port 48 and the graphics accelerator 50. A television 54 may be coupled to the video output of the graphics accelerator 50. The chipset 46 is also coupled to a bus 56 that may be, for example, a Peripheral Component Interconnect bus (PCI) bus. See revision 2.1 of the PCI Electrical Specification available from the PCI Special Interest Group, Portland, Oreg. 97214. The bus 56 connects to a TV tuner/capture card 58 that provides tuning and demodulation for receiving the digital signal. The card 58 may be coupled an antenna 60 or other source of digital video such as a cable input, a satellite receiver or the like. The bus 56 is also coupled to a bridge 62 that couples the hard disk drive 64. In an embodiment, a broadcast, such as an airwave broadcast, may be captured by the tuner card 58 and may be provided to a storage, such as a hard disk drive, via a bridge 62. The storage 64 may store the captured broadcast in a randomly accessible fashion in some embodiments. The storage 64 may also store software programs 28, 80, 750, 870, 780, and 900.

The bridge 62 is also coupled to another bus 66 that may be coupled to a serial input/output (SIO) device 68. In one embodiment of the present invention, the device 68 is in turn coupled to an interface 70 that may be an infrared interface. The interface 70 communicates with a remote control unit 72. The device 68 may also be coupled to peripheral devices such as a mouse (not shown) and/or a keyboard (not shown). Also connected to the bus 66 is a basic input/output system (BIOS) 74.

In some cases, a large amount of content may eventually be downloaded or otherwise acquired and stored in a storage medium associated with the system 10. For example, the receiver 16 may be capable of digitally recording and playing back audio and/or video content. The recorded content may include radio broadcasts, television broadcasts, and content distributed over the Internet as examples. The television programming may be distributed in a variety of ways including over airwave broadcasts, via cable distribution, and over satellite distribution networks. In conventional systems, the storage medium may be a hard disk drive. Thus, it may be useful for the user to know what content has been stored on the user's hard disk drive. A file may be assembled which gives the user a content guide that lists all the content that is still available for access through the shell 22. In this way, the user can select that content by selecting one of the entries in the content guide. For example, the entries in the content guide may be selected by mouse clicking on them causing the content to immediately begin play.

While a digital receiving system has been described above, the present application is equally applicable to analog systems such as analog television receivers that work with set-top boxes. In such case, storing instructions may be provided over the vertical blanking interval in one embodiment of the present invention. Alternatively, storing instructions may be received over the Internet or through some other source.

In another alternate embodiment, interruption instructions, interrupting content and interruptible content may be received over the Internet 26. In such case, the content may be forwarded through the program guide 24 and directly to the encrypted cache 20. As a result, the content bypasses the tuner/demodulator 18 but still ends up being stored in the encrypted cache 20 as described previously. That information may then be accessed through the shell 22 in the same way as information stored in the encrypted cache 20 via the tuner/demodulator 18. The interruption instructions may be sent through the program guide 24 to the shell 22.

Figure 4:
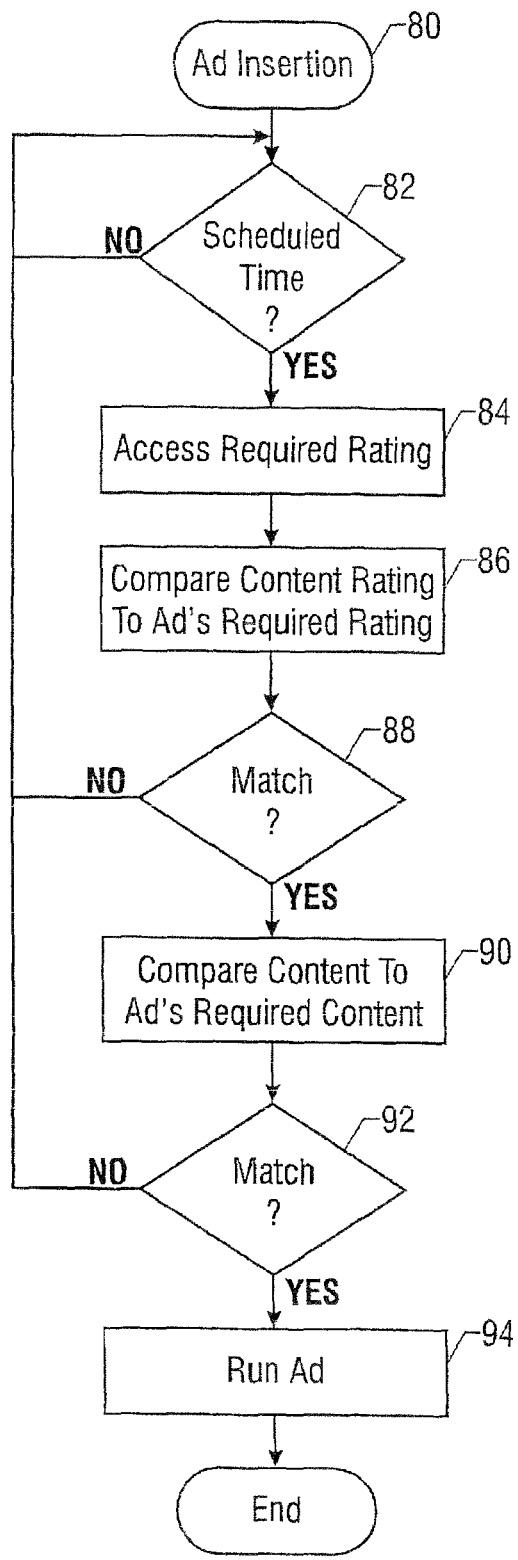
FIG. 4 is a flow chart for software in accordance with one embodiment of the present invention.

The software 80, shown in FIG. 4, enables the insertion of advertisements in an interruptible content delivery system to implement advertiser insertion guidelines. Advertisers may wish to avoid having their advertisements associated with particular types of content considered unsuitable. For example, some content may have sex, language, violence or other aspects which the advertiser may wish to avoid becoming associated with. In addition, an advertiser may prefer that its advertisements be played in association with particular types of content. For example, an advertiser may believe that people who enjoy particular types of content may be more or less likely to purchase particular types of products and services. Thus, advertisers may wish to control the content with which their advertisements are associated. Advertisers may wish their advertisements to run in conjunction with specific types of content. Embodiments of the software 80 enable these types of guidelines to be automatically implemented.

The software 80 begins by determining whether a scheduled advertising time has arrived as determined in diamond 82 in accordance with one embodiment of the present invention. In some cases, particular advertisements may be inserted at particular times. In other cases, the advertisements may be inserted using other determining characteristics.

In an embodiment in which scheduled time is the event that triggers the play of a particular advertisement, a required rating for a particular advertisement is accessed, as indicated in block 84. Each advertisement may be identified with a particular rating that indicates the nature of content with which the advertisement may be associated. Thus, content may be rated, for example on a numerical system, based on characteristics that may be considered suitable or unsuitable to various advertisers. For example, the presence of violence, sex, race issues, or language aspects may be used to assign a particular rating to content making that content more or less desirable to particular advertisers. For example, some advertisers may wish to be associated with content that includes obscene language while other advertisers may prefer not to be associated with such content.

In one embodiment of the present invention, the content may receive an overall suitability rating which may be accessible in a database, for example. In other embodiments of the present invention, the content may receive suitability ratings with respect to a number of aspects such as language, sexual content, violence, and the like.

The suitability rating of a particular item of content currently being played by the user may be compared to a rating required by a particular advertiser as indicated in block 86. If there is a match, as determined at diamond 88, the nature of the content is compared to any specific requirements for types of content desired by the advertiser as indicated in block 90. For example, in a system in which audio files are made available to users, one advertiser may prefer to advertise in connection with rock and roll content while another advertiser may prefer to advertise in connection with jazz content. A check at block 90 determines what types of content, if any, have been specified by the advertiser. For example, keywords in content descriptions may be searched to see if there is a content type match with the advertiser's content type guideline.

In some embodiments, the content may be divided into a number of different chapters. Each chapter may be described using one or more keywords. The keyword or combinations of keywords for the content's chapters may be distributed as part of the interruption instructions. Alternatively, the keywords for the chapters may be incorporated into the content. The keyword or keywords may include relevant scene characterization and/or product placement presented in the corresponding chapter. Thus, in some embodiments, the system may use one keyword or combinations of keywords for a program or a chapter of a program to select an appropriate advertisement for presentation.

If there is a content type match, as determined in diamond 92, the advertisement is run as indicated in block 94. If there is not a content type match at diamond 88 or at diamond 92, the flow iterates back to the beginning.

An automated system may then implement advertiser guidelines with respect to suitability and content type, as two examples. In one embodiment, each content file may include an identifying field that provides information about suitability and content type. Similarly, the advertisements may be associated with suitability and content type requirements. The software 80 matches the suitability and content type requirements with the actual content being played at any particular time and determines whether a particular advertisement is suitable for insertion in connection with the on-going content being played.

Figure 7:
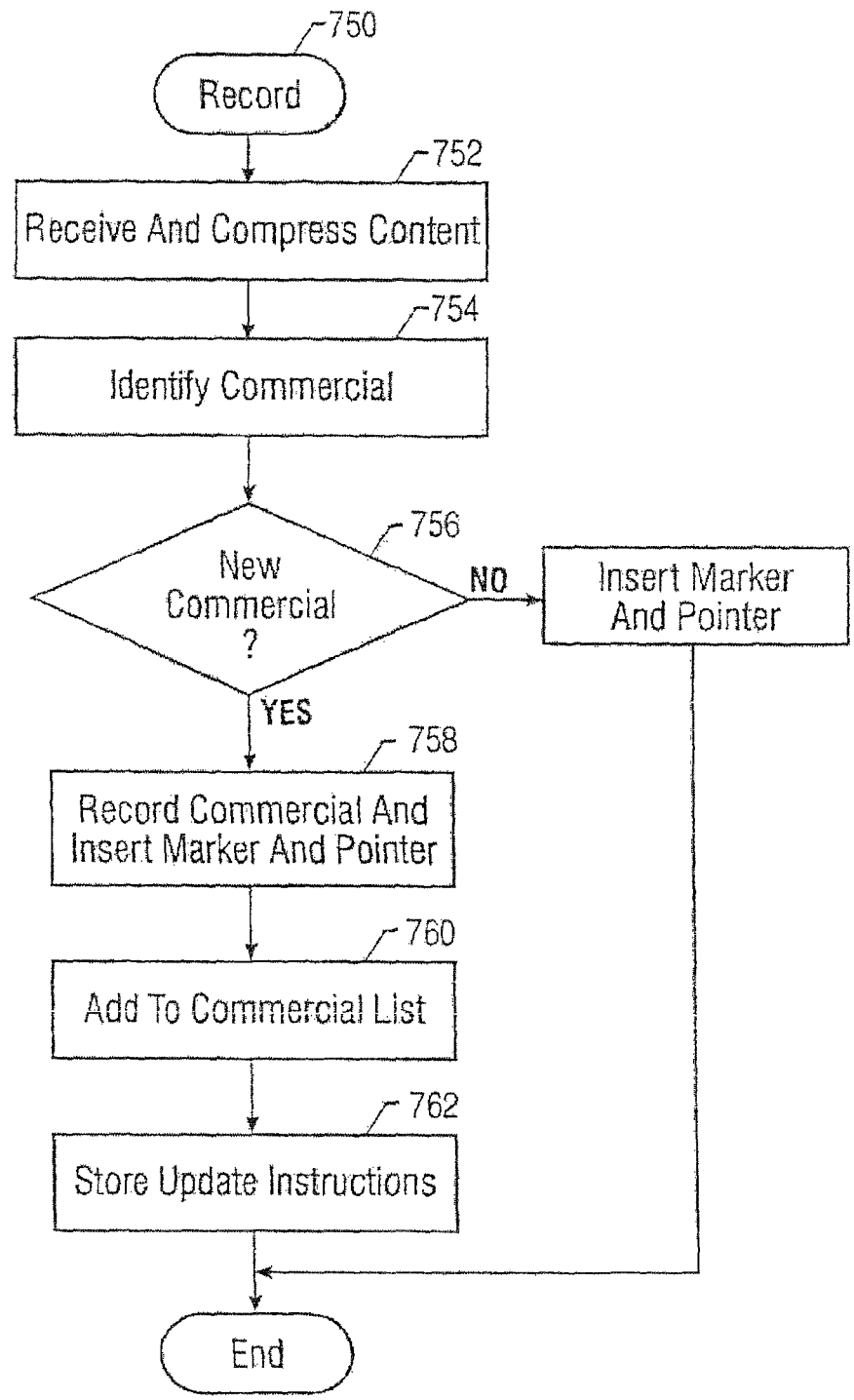
FIG. 7 is a flow chart for software that enables commercials to be digitally recorded in accordance with one embodiment of the present invention.

According to an embodiment, the content may be received over an airwave broadcast such as a radio broadcast, a television broadcast or the like. It may also be received over an appropriate connection such as an Internet connection, a cable connection or a satellite receiver. As is shown in FIG. 7, the software 750, stored on the storage 64, begins by receiving and compressing audio and/or video content as indicated in block 752.

In the course of receiving and compressing the content, a commercial may be identified within the content as indicated in block 754. A variety of techniques may be utilized to identify the commercial. In one case, a watermark may be included within commercials. The watermark may be imperceptible to users. However, the watermark may be detected and used as a trigger to identify the location within the content of a commercial.

In another embodiment, the commercial may be identified by looking for auxiliary information included in the television broadcast. For example, closed captioning data may be scanned to locate particular keywords that are known to correspond to particular advertisements.

As another example, a television advertisement schedule may be utilized to determine, based on the currently tuned channel, local time zone, and time of day when a commercial should be expected. Similarly, in enhanced or interactive television distribution systems, for example according to the Advanced Television Enhancement Forum (ATVEF) Specification, announcements may be provided which may aid in detecting the presence of a commercial. See ATVEF Enhanced Content Specification (1998).

When a commercial is identified within the received content, a check at diamond 756 determines whether the commercial that is being received is one that has been stored before. If not, in which case the commercial is considered a "new" commercial, the commercial may be recorded as indicated in block 758.

In one embodiment of the present invention, the commercial may be recorded to a different memory or a different memory location than other content. This may facilitate accessing the commercial in accordance with some embodiments of the present invention.

When the commercial is recorded, a marker may be inserted into the ongoing content record in order to identify the location to insert a commercial. In addition, a pointer may be provided to indicate where the commercial has been stored, when the commercial is stored in a different storage or in a different storage area than the rest of the content. Thus, in some embodiments, marker and pointer information may be embedded into the content. In other embodiments, however, marker and pointer information may be kept in a separate data file.

The new commercial may be identified by keywords or other information and added to a list of commercials that have previously been stored as indicated in block 760. In this way, a list of commercials may be utilized to determine whether any received commercial is one that has been received in the past. For example, the closed captioning script associated with the first five or ten words of a commercial may be recorded and stored as a commercial list. Then, the next time a commercial is received, a check may determine whether the first five or ten words are identical to any commercial already on the commercial list.

Finally, the update instructions for a particular commercial may be stored as indicated in block 762. In enhanced or interactive transmissions, the update information may be broadcast as auxiliary information. In other cases, the update information may be encoded with the commercial. As still another alternative, the update information may be accessed from a database. For example, based on telltale words within the commercial, such as the first five or ten words, a database may be consulted to determine how frequently the particular commercial should be updated. As one example, the database may be accessed automatically over the Internet. Once the update instructions are obtained, they may be stored in association with an update database. For example, in accordance with one embodiment, at predetermined times, all of the stored commercials may be automatically updated in accordance with stored update instructions.

If the commercial is one that has previously been stored, the appropriate marker and pointer are stored in connection with the ongoing content in an embodiment in which the commercials are stored in a separate storage from the content. In an embodiment in which the content and commercials are stored together, it may unnecessary to insert the marker and pointer into the stored content. However, storing the commercials and the content separately may facilitate separate access to these materials. In addition, by storing the materials separately, it is possible to avoid re-storing commercials which have been previously stored. This may save storage space and increase the amount of programming that may be stored on a given system 16.

Figure 8:
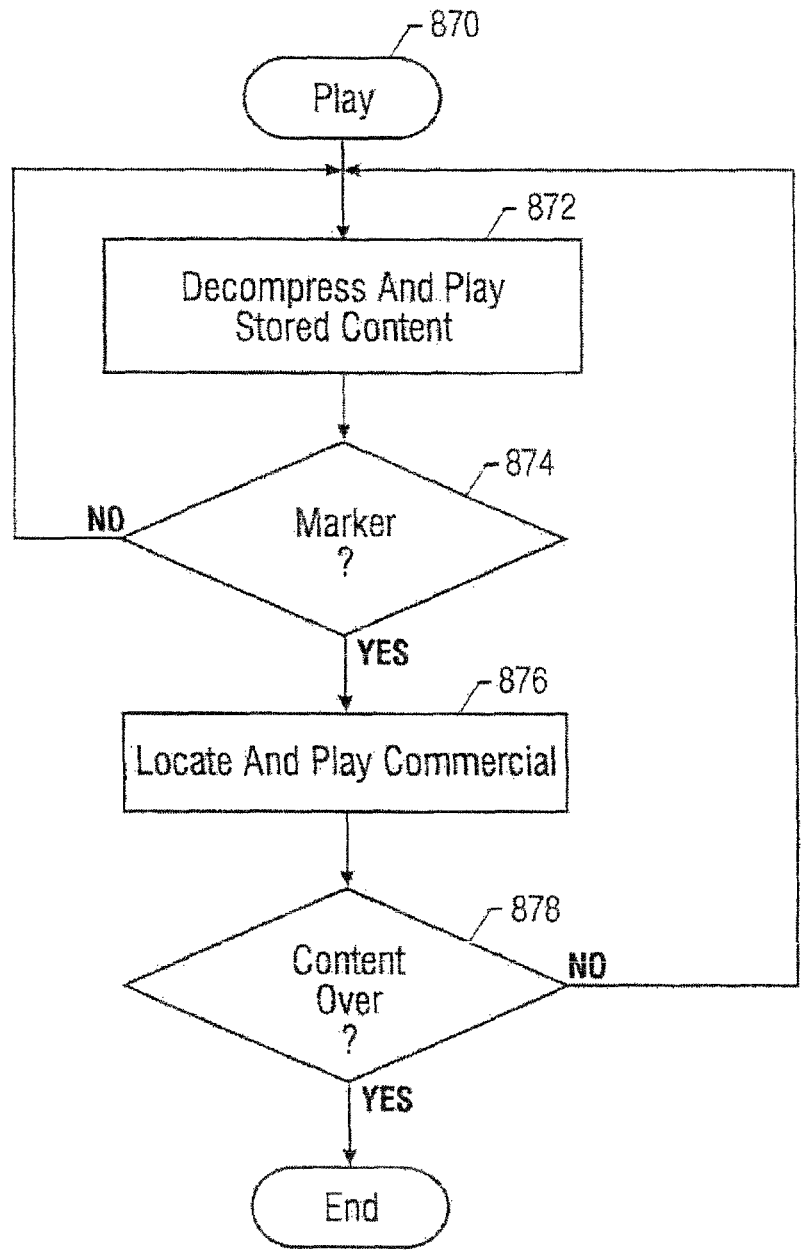
FIG. 8 is a flow chart for software that allows the playback of recorded content including commercials in accordance with one embodiment of the present invention.

The play software 870, shown in FIG. 8, also stored on the system 16 on the storage 64, in accordance with one embodiment of the present invention, enables content to be played back and stored commercials to be inserted into the content at the appropriate locations. Initially, the stored content is decompressed and played as indicated in block 872. If a marker is located when playing the stored content, as determined in diamond 874, a commercial to be inserted at the marker is automatically located and played as indicated in block 876. The commercial may be located using the pointer that points the software to the storage location where the commercial has been stored. Alternatively, in some embodiments, a decision process as to what commercial should be inserted at the marker is made so that an appropriate commercial may be located. For example, the software may decide what commercial is appropriate using advertiser guidelines, keywords, or other criteria, and a pointer to that commercial may be provided to locate the commercial.

In some embodiments, the decision-making process may occur prior to playing the stored content, such as sometime after recording the content or in response to the selection of a content item for play. For example, marker and/or pointer information may be accessed before the content is played and a decision may be made as to what commercials should be inserted at different locations within the content. The markers and pointers then direct the software to the location of a commercial that is determined to be appropriate, for a particular locality within the content, for example based on advertiser guidelines. If the content playback is completed, as determined in diamond 878, the flow ends. Otherwise, the flow recycles and the content continues to decompressed and played.

Figure 9:
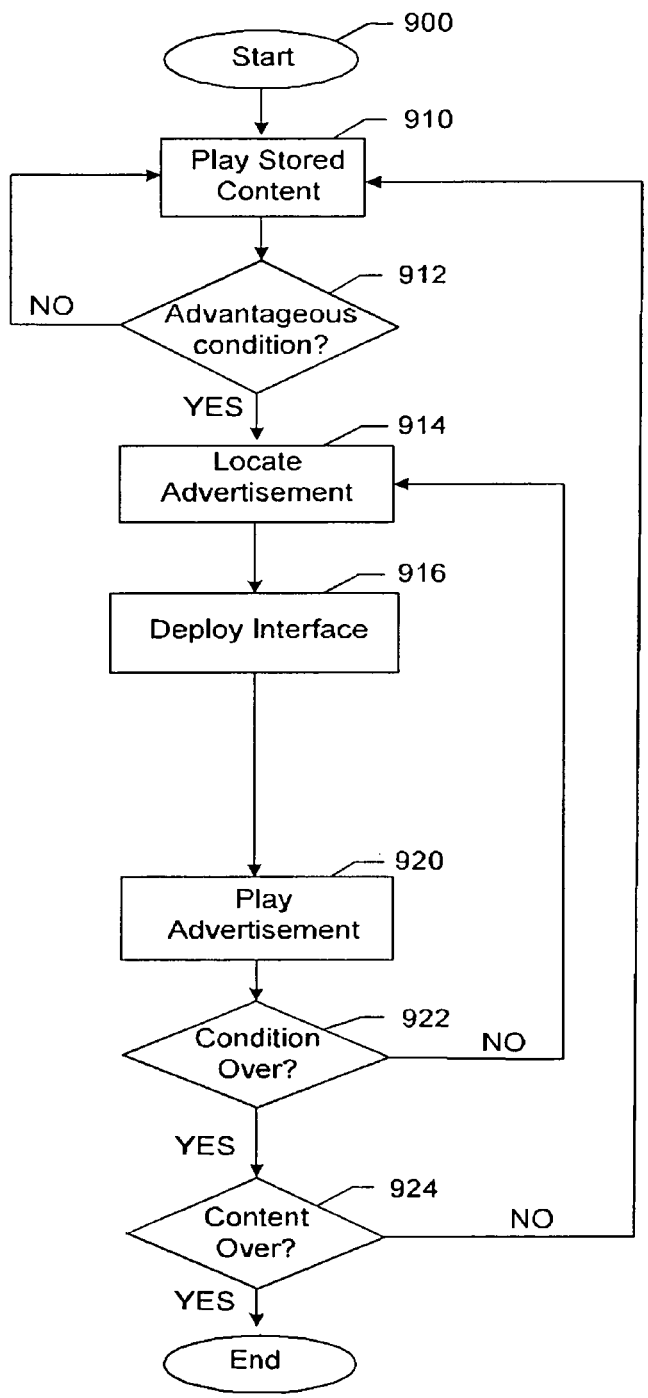
FIG. 9 is a flow chart for software in accordance with an embodiment of the present invention.

Referring to FIG. 9, software 900 may begin when content is retrieved from the cache for use on the receiver 16 as is shown in block 910. For example, a movie that has been previously recorded may be selected for viewing. The system 16 may monitor for an advantageous condition such as a user-initiated event. User-initiated events include pausing, stopping, fast forwarding, and rewinding the content as is known in the art. If the system detects an advantageous condition (diamond 912) an advertisement is located (block 914).

Because the timing and the location of a user-initiated interruption can not be predetermined by the content provider, a way must be devised to implement advertiser guidelines for advertising insertion. For example, the system 16 can employ information provided in keywords associated with the part of the content where the interruption condition occurred. Alternatively, the system can locate the nearest markers or the last previously detected marker and use the pointer associated with the marker to find the advertisement associated with the marker. The system can either use the advertisement identified by the marker or use the advertisement guidelines associated with this advertisement to determine the best match out of available advertisements and this particular interruption event. In yet another alternative, the system can use a combination of guidelines and keywords associated with the part of the content where the interruption occurred to determine the advertisement to be inserted. In yet another alternative, this choice of advertisements can be performed by the system dynamically, before the interruption event after detecting the first marker or the first set of keywords. In other embodiments, advertisements may be chosen before the content is played by accessing the markers and/or keywords associated with the content. In fact, in some embodiments, keywords associated with the content may trigger advertising with or without user interaction. For example, a user may be watching video content and an advertising banner may appear adjacent to the video content or an advertisement may overlay the video content. The banner or overlay may change over time based on the one or more keywords associated with at least a portion of the content. The triggering keywords may be embedded in the content or they may be contained in a database associated with the content. Furthermore, the advertisements may change over time based on start and end time values for the keywords associated with the content. The keywords and values may correspond to scenes, objects, and/or actions in content.

Thus, after an advertisement is located, as indicated at block 914, an appropriate interface such as a banner or an overlay, or an interface such as interface 500a, 500b, or 600 (FIGS. 5a, 5b, and 6, respectively) may be displayed (block 916). The interface may include the advertisement or advertisements that are determined to be appropriate for the particular interruption event.

In an embodiment where the user selects an advertisement, the system can detect this selection so that the selected advertisement can be played. In other embodiments an advertisement is automatically played, without user selection. Either way, an advertisement can be played as indicated in block 920. As is indicated by diamond 922, if the advertisement ends and the advantageous condition is still present, the interface may be displayed again with the same or different advertisement. If, however, the advantageous condition ceases to exist (diamond 922), for example by resuming play of the content, or a time end value for a particular keyword, then a check is made at diamond 924 to see if the content is over. If the content is not over the content resumes regular play until the next advantageous condition arises, otherwise, the flow ends. Alternatively, in some embodiments, when the content is over (and/or before it starts) an interface may be displayed such as a banner, an overlay, or an interface such as interface 500a, 500b, or 600. If the interface includes one or more selectable options, the user may select one or more of the options for viewing. Otherwise, an advertisement may be displayed without user selection based on keywords, markers, and/or advertiser guide lines associated with the content just viewed or that is selected for viewing.

Figure 10:
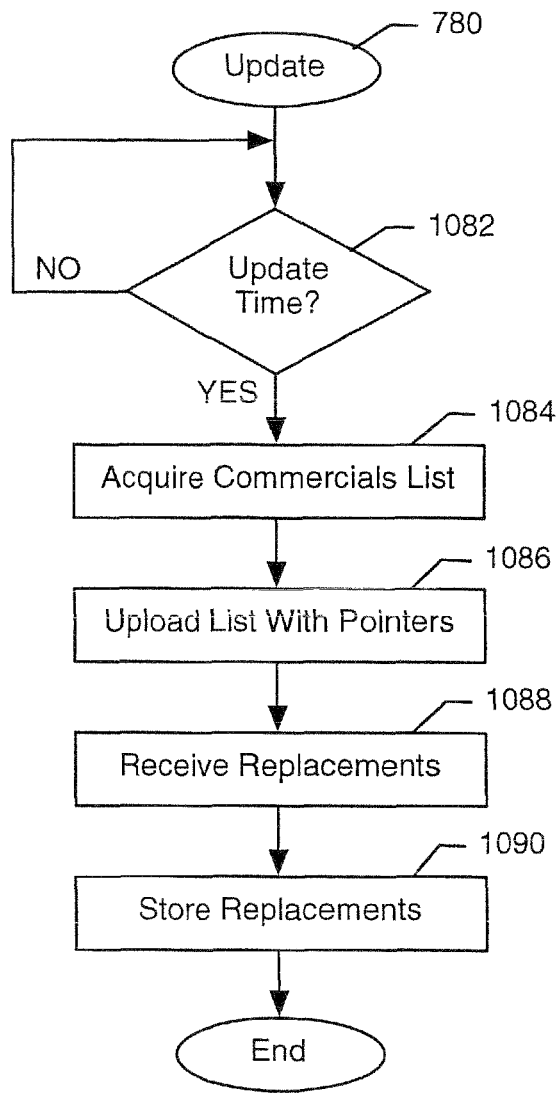
FIG. 10 is a flow chart for software that allows recorded commercials to be updated in accordance with one embodiment of the present invention.

Turning finally to FIG. 10, the update software 780, also stored on the storage 64, in accordance with one embodiment of the present invention, enables automatic updates of stored commercials. As previously indicated, update instructions may be acquired and stored at the time when a commercial is first received. In other embodiments, update instructions may thereafter be obtained. For example, by identifying a commercial using codes or keywords as two examples, a system may automatically determine from a database when the commercial should be updated. In one embodiment, each system 16 may include a database that has been compiled for each commercial in the acquired commercials list. The database may include the times when a commercial should be updated.

When the update time arrives for a given commercial as determined at diamond 1082, a commercials list for a given system 16 may be acquired as indicated in block 1084. The list may then be uploaded, as indicated in block 1086, together with the pointers which point to the locations where the information associated with the commercial is stored on the system 16. The uploading may occur from a client to a server over an appropriate connection such as an Internet connection.

The server may then provide the appropriate updates for the client over an appropriate broadcast transport back to the client as indicated in block 1088. A client may store the replacements, as indicated in block 1090, in the same locations previously utilized. If the server provides the same pointers that were used to originally store the outdated version of the commercial, the commercials may automatically be stored in the same locations where they were originally stored. In such case, when a marker is reached during content playback, the pointer associated with the marker may be utilized to obtain the commercial. Now, instead of obtaining the outdated commercial, an updated commercial may be received.

For example, a commercial for a given plays the stored content, the user may view the most current advertisement. This may improve the effectiveness of the advertising material.

In some embodiments of the present invention, a stored advertisement may be replaced with an updated advertisement. However, in other embodiments, the stored advertisement may be replaced with another advertisement that does not constitute an update. For example, a digital recording device may automatically replace recorded advertisements with other advertisements. In one embodiment, the provider of the digital recording device may cause advertisements originally recorded with content to be subsequently replaced with advertisements sponsored or provided by the provider of the digital recording device. Thus, in some cases, the advertisements that were originally included with the content may be replaced by other advertisements. These other advertisements may generate revenue for a service provider or the provider of the digital recording device as two examples.

In one embodiment, at periodic intervals, the digital recording device could download a number of advertisements to be utilized to replace existing advertisements recorded with the content. Thereafter, the advertisements that were originally recorded with content could be replaced with new advertisements. In some cases, the replacing advertisements may be updates of existing advertisements. In other cases, the replacing advertisements may be totally new advertisements unrelated to the advertisements they replace.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a receiver to receive content and an advertisement;
a cache, coupled to said receiver, to store said content and said advertisement;
an interface, in said receiver, to receive an updated advertisement and updating instructions, said updating instructions to enable the receiver to replace the stored advertisement with the updated advertisement;
wherein said receiver is to detect a starting point of said advertisement and to create a marker and insert it into the content to indicate said starting point, and to store said advertisement from the content to a memory storage location separate from the content, and to create and store a first pointer to the memory location;
said interface to detect a user-initiated pause in viewing of content, to retrieve the updated advertisement from storage, and to provide a user interface that enables the user to view the retrieved updated advertisement for as long as the viewing of the content remains paused; and
the receiver configured to overlay the retrieved updated advertisement with material descriptive of upcoming content in the received content.

2. The system of claim 1 wherein said receiver is adapted to enable storage of the updated advertisement in a location other than the location of said stored advertisement that the updated advertisement is to replace, and to create and store a second pointer to said other location.

3. The system of claim 1 wherein said receiver is to receive additional content together with another advertisement, said receiver to determine whether the another advertisement was previously stored.

4. The system of claim 3 wherein said receiver is to store said received advertisement only if the received advertisement was not previously stored.

5. The system of claim 1 wherein said cache stores the marker and a second pointer information in a file other than an associated content file, the marker identifying a location in the content to insert the updated advertisement, the second pointer identifying a stored location of the updated advertisement in the cache, and the receiver uses the marker and second pointer information prior to the display of content from that content file.

6. The system of claim 1 wherein said receiver is to maintain a list of stored advertisements and to compare information about a newly received advertisement to information on said list of stored advertisements to determine whether said newly received advertisement was previously stored.

7. The system of claim 6 wherein said receiver is to upload said list of stored advertisements, to a remote server, along with pointers to said stored advertisements.

8. The system of claim 1 wherein said receiver is to receive information about when to update said stored advertisement and automatically update said stored advertisement in accordance with said information.

9. The system of claim 1 wherein said receiver periodically, automatically updates advertisements.

10. The system of claim 1 wherein said system is a set-top box.

11. The system of claim 1 wherein said system stores a plurality of advertisements, and said user interface enables the user to select, from a subset of said plurality, one or more advertisements for viewing so long as the content remains paused.

* * * * *